United States Patent

[11] 3,559,769

| [72] | Inventor | Erich Arbeitlang |
| | | Ottobrunn, Germany |
| [21] | Appl. No. | 754,699 |
| [22] | Filed | Aug. 22, 1968 |
| [45] | Patented | Feb. 2, 1971 |
| [73] | Assignee | Bolkow Gesellschaft mit beschrankter Haftung |
| | | Ottobrunn, Munich, Germany |
| [32] | Priority | Aug. 25, 1967 |
| [33] | | Germany |
| [31] | | P 15 31 555.6 |

[54] SATELLITE WALL STRUCTURE PARTICULARLY FOR SUPPORTING SOLAR CELL
10 Claims, 4 Drawing Figs.

[52] U.S. Cl. ................................................... 188/1,
188/103
[51] Int. Cl. ............................................ F16f 7/10

[50] Field of Search .......................................... 188/18, 103

[56] References Cited
UNITED STATES PATENTS
| 1,940,449 | 12/1933 | Dodge | 188/1UX |
| 2,721,028 | 10/1955 | Dills | 188/1UX |
| 3,160,549 | 12/1964 | Caldwell et al. | 188/1UX |
| 3,324,974 | 6/1967 | Champlin et al. | 188/1 |

Primary Examiner—Duane A. Reger
Attorney—McGlew and Toren

ABSTRACT: A vibration damped structure having a double wall construction, particularly for use as a solar cell supporting surface for satellites comprises two wall layers which are clamped into a clamping frame with different initial stress. The wall layers are interconnected by an intermediate filler material imbedded between the walls.

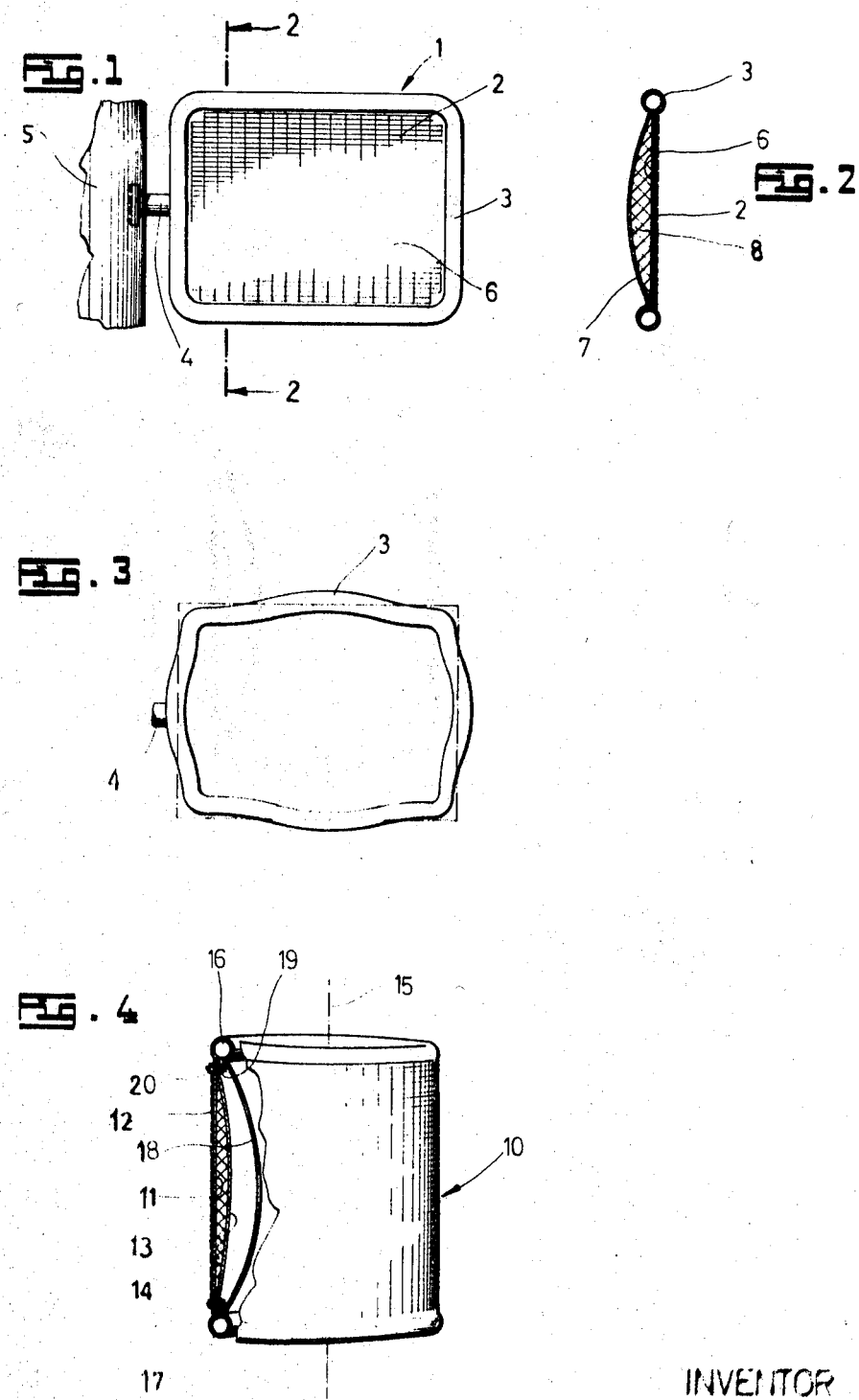

SATELLITE WALL STRUCTURE PARTICULARLY FOR SUPPORTING SOLAR CELL

SUMMARY OF THE INVENTION

This invention relates, in general, to the construction of structures suitable for satellite use and, in particular, to a new and useful vibration damped wall construction providing a solar cell supporting surface for satellites.

In the case of relatively large surfaces, it is often very necessary to reinforce the surface support structure by an amount in addition to that which would ordinarily be required by the strength requirements for the particular dimensions involved. This reinforcement is necessary in order to protect such surfaces against damage during transport or against vibrations which occur. It is known in the automobile industry to construct supporting surfaces with double walls and to damp the walls by the application of soundproofing layers or mats between them. These measures bring about an increase in the bending stiffness of the surfaces and, also, an increase of the oscillating mass. In many cases, especially in aviation and space travel fields, such a measure is not advantageous because of the increased structural weight connected therewith. This problem arises especially in connection with the use of relatively large area solar cell supports for satellites. During the launching phase, such supports sustain considerable load from the vibrations of the rocket engines. It is therefore necessary that the surfaces be damped effectively without any major increase in the mass of the structure. This damping must be carried out at least in certain vibration frequency ranges.

In accordance with the invention, this problem is solved by providing a double wall layer construction and by clamping the wall layers in a clamping frame with an initial stress acting on one layer. The two layer surfaces are interconnected by means of a filler material imbedded therebetween.

With the inventive construction, the wall elements are coupled in an oscillation system and the two oscillators have different natural oscillating frequencies. One of the oscillators acts as a damping resistance in the natural oscillation range of the other. The invention is based on the realization that an oscillating mass spring system can be influenced, not only by variation of the oscillating mass itself, but also by variation of the spring values.

The weight factor of the clamping frame, especially when elastic wall materials are employed, is much less than would be required with vibration damped structures presently known. The filler material imbedded between the wall layers provides a mechanical coupling of the layers capable of vibration.

The inventive construction is effected by elastically deforming the clamping frame in order to tension one of the wall layers upon release of the frame, and the other one is applied without tension into the frame. For the purpose of assembly of the wall layers with the frame, the frame is given an initial stress in an apparatus so that the wall layer may be initially installed without tension, but will be subjected to a tension after the frame is released from the apparatus. The construction includes a surface, which is substantially planar or flat in its tension state and the other surface is curved or arched. The tension setup by the clamping frame is thus absorbed almost entirely by the flat surface and the arched surface remains under very little or no tension.

Because of the different magnitudes of the initial stress on each wall layer, they have different vibration numbers. The filler material establishes a coupling of the two wall layers capable of vibration and effects a damping of one wall layer in case of excitation of the other.

In one embodiment of the invention, the clamping frame is such that the structure forms a cylinder. In this embodiment, two annular tubular frame members are arranged in axially spaced concentric dignment. An outer wall layer is tensioned between the annular frames by an internally positioned spring or clamping strut, which urges the two frame elements axially apart. The inner layer or inner wall is arched toward the interior of the cylinder. The initial stress, which is set up by the clamping struts, acts in a direction of the cylinder axis and the outer wall layer is prestressed more than the arched inner wall layer.

According to another feature of the invention, a filler material of a foam plastic is advantageously employed in order to provide a work-absorbing property. Thus, only a part of the energy which is transmitted to the damping wall layer by one of the excited wall layers will be transmitted completely to the other wall layer, the remaining part of this energy being absorbed by the filler material.

Accordingly, it is an object of the invention to provide an improved structure, particularly for use in space, which includes a clamping frame and a double wall structure clamped by said frame in a manner to tension one of the layers by an amount more than the other and including a filler material between the walls coupling them together for vibration purposes.

A further object of the invention is to provide a satellite structure which includes a planar surface adapted to carry solar cells on one side and a curved surface on an opposite side and with filler material between said surfaces, and a clamping frame clamping said surfaces in a manner to tension the planar surface.

A further object of the invention is to provide a cylindrical surface for use in space, which includes an outer flat surface for mounting photocells and an inner curved layer together forming a double wall construction with a filler material therebetween and a clamping frame of a tubular construction at each end, and means biasing said clamping frames at each end in outward axial directions to tension the outer layer.

A further object of the invention is to provide a structure, particularly for the use in mounting solar cells for satellites, which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the Drawings:

FIG. 1 is a partial side elevational view of a satellite body with a solar cell mounting structure constructed in accordance with the invention;

FIG. 2 is a section taken on the lines 2–2 of FIG. 1;

FIG. 3 is a front elevational view of the frame structure indicated in FIG. 1 before application of the layer surfaces thereto; and FIG. 4 is a perspective view, partly broken away, of another embodiment of a satellite solar cell support.

DETAILED DESCRIPTION OF THE PREFERRED EMBODIMENTS

Referring to the drawings, in particular, the invention embodied therein in FIGS. 1 to 3 comprises a support generally designated 1, particularly for the mounting of solar cells, which includes a clamping frame 3, which in the embodiment illustrated, is rectangular. The frame 3 is mounted on a connecting arm, which is carried by a satellite body 5.

In accordance with the invention, the supporting structure 1, includes a first wall layer 6, which in the embodiment illustrated, is substantially planar or flat and which carries solar cells 2. In addition, the structure 1 includes a second wall layer 7, which is of arch-shaped or curved construction.

The frame 3 is made up of a single continuous tube or a plurality of tubes, and during assembly, it is held in the configuration indicated in FIG. 3. The wall layer 6 is so dimensioned that when it is secured within the frame, it will be tensioned into the planar shape indicated in FIG. 2 after the frame is released from the configuration indicated in FIG. 3. The wall layer 7, on the other hand, is dimensioned so that it retains an arched configuration even when the layer 6 is completely tensioned so that it not participate in the absorption of forces or it participates only to a small extent. The resultant construction provides layers 6 and 7 of differing natural oscillation numbers and because of this, one of the wall layers will act as a damper for the other of the wall layers when the latter is oscillated in its natural oscillation range. A filling layer 8, of a material such as a foam plastic, is disposed between the wall layers 6 and 7 and acts as a coupling of these layers so that the vibration is transmitted therethrough from one wall layer to the other.

The form indicated in FIG. 3 is chosen so that the flexure of the tubes will remain in the elastic range. By clamping the frame in this manner, the wall layers 6 and 7 can be installed without initial stress and the stressing occurs only after the frame 3 is released.

In the embodiment illustrated in FIG. 4, there is provided a cylindrical supporting structure 10, including an outer flat wall layer 11 which is covered with solar cells 12 and an inner curved or arched wall layer 13. A filler material 14 is arranged between the wall layers. The inner wall layer 13 is longer in the axial direction of the cylinder axis 15 than the wall layer 11 so that upon tensioning in this direction, the outer layer 12 will be stretched while the inner layer is not tensioned or just barely tensioned. Because of this, the outer wall layer 11 has a much higher natural oscillation number than the inner wall layer 13.

The clamping means for the wall layers 11 and 13 comprises an upper clamping ring 16 and a lower clamping ring 17 of hollow tubular construction. In this embodiment, spring struts 18 are disposed between the frame members 16 and 17 and urge them apart in the direction of the axis 15. Each clamping ring 16 and 17 is provided with an axially extending portion or flange 19 to which wall layers 11 and 13 are fastened with screws 20.

I claim:

1. A vibration damped structure particularly for use as solar cell supporting surfaces for satellites, comprising first and second spaced wall layers, a filling material disposed between said first and second wall layers, and clamping frame means holding each end of said wall layers together and connected to exert a greater stress on said first wall layer than said second wall layer.

2. A structure, according to claim 1, wherein said clamping frame means comprises an encircling frame which is initially and elastically deformed and which elastically tensions said first wall layer.

3. A structure, according to claim 1, wherein said first layer has an exterior substantially flat surface.

4. A structure, according to claim 1, wherein said first layer is substantially flat and said second layer is arched.

5. A vibration damped structure particularly for use as solar cell supporting surfaces for satellites, comprising first and second spaced wall layers, a filling material disposed between said first and second wall layers, and clamping frame means holding said wall layers and connected to exert a greater stress on said first wall layer than said second wall layer, said structure being of substantially cylindrical form with said first layer forming the outer surface of said cylindrical form; said clamping frame means comprising a ring connected to each end of said first and second wall layers.

6. A structure, according to claim 5, wherein said clamping frame means includes strut means urging said rings apart, said first wall being dimensioned so that it will be tensioned by said clamping frame means, said second wall being arched inwardly toward the axis of said cylinder.

7. A structure, according to claim 1, wherein said filler material comprises a foam material.

8. A support structure particularly for use with satellites, comprising an endless tubular frame, a first substantially flat layer connected peripherally to said frame and tensioned by said frame, a second layer arched within and connected to said frame and spaced from said first layer and a filler material disposed between said first and second layers and coupling said layers together for vibration transmission purposes.

9. A support structure particularly for use with satellites, comprising first and second annular frame members located in axially aligned and axially spaced relationship, an outer cylindrical flat layer connected between said first and second frame members, an inner cylindrical and inwardly curved layer connected between said first and second frame members and being spaced from said first layer, a filler material disposed between said first and second layers, and means between said first and second frame members for urging said frame members apart and for tensioning said first layer.

10. A supporting structure, according to claim 8, wherein each of said annular frames includes an axially extending flange portion extending toward the opposite one of said frames, said first and second layers being clamped to said flange portions.